(12) United States Patent
Sommerlade et al.

(10) Patent No.: US 12,001,437 B2
(45) Date of Patent: Jun. 4, 2024

(54) GENERATING AND USING A SEMANTIC INDEX

(71) Applicant: Microsoft Technology Licensing, LLC, Redmond, WA (US)

(72) Inventors: Eric Chris Wolfgang Sommerlade, Oxford (GB); Vivek Pradeep, Redmond, WA (US); Steven N. Bathiche, Bellevue, WA (US); Nathan Luquetta-Fish, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/953,048

(22) Filed: Sep. 26, 2022

(65) Prior Publication Data

US 2024/0104103 A1    Mar. 28, 2024

(51) Int. Cl.
  *G06F 16/2457* (2019.01)
  *G06F 16/22* (2019.01)
  *G06F 40/30* (2020.01)

(52) U.S. Cl.
  CPC .... *G06F 16/24575* (2019.01); *G06F 16/2228* (2019.01); *G06F 40/30* (2020.01)

(58) Field of Classification Search
  CPC . G06F 16/24575; G06F 16/2228; G06F 40/30
  See application file for complete search history.

(56) References Cited

U.S. PATENT DOCUMENTS

| | | | |
|---|---|---|---|
| 2014/0337005 A1* | 11/2014 | Abdel-Hady | G06F 16/35 704/2 |
| 2015/0153993 A1* | 6/2015 | Vis | G06F 3/04886 345/1.3 |
| 2019/0363945 A1* | 11/2019 | Rogynskyy | G06F 16/245 |
| 2020/0302340 A1* | 9/2020 | Durand | G06N 3/045 |
| 2022/0019608 A1* | 1/2022 | Schwabe | G06F 16/9035 |

OTHER PUBLICATIONS

Dumais, et al., "Stuff I've seen: A system for personal information retrieval and re-use", In Proceedings of the 26th Annual International ACM SIGIR Conference on Research and Development in Information Retrieval, Jul. 28, 2003, pp. 72-79.

* cited by examiner

*Primary Examiner* — Mark D Featherstone
*Assistant Examiner* — Kweku William Halm

(57) ABSTRACT

Methods and systems for generating and using a semantic index are provided. In some examples, content data is received. The content data includes a plurality of subsets of content data. Each of the plurality of subsets of content data are labelled, based on a semantic context corresponding to the content data. The plurality of subsets of content data and their corresponding labels are stored. The plurality of subsets of content data are grouped, based on their labels, thereby generating one or more groups of subsets of content data. Further, a computing device is adapted to perform an action, based on the one or more groups of subsets of content data.

18 Claims, 11 Drawing Sheets

GENERATING AND USING A SEMANTIC INDEX

BACKGROUND

Many times users desire to recall past events, but since memories are known to fail, it can be difficult for users to remember details from various moments of time. When trying to recall details, the users may remember at least some of the different types of contextual information related to their everyday lives. For instance, following a meeting, where many different topics are covered, a user may not remember all of them. However, the user may remember other aspects of the meeting, such as the location, some of the attendees, and the like. In fact, many events in our everyday lives comprise many different subsets of information, such as weather, location, people, news, sights, and sounds. While computing devices are able to collect weather data, location data, participant information, related news data, and other audio/video data, given the unstructured nature of such data, it is not helpful in user recall.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for generating and using a semantic index for users when trying to recall details of past events. Some aspects relate to computing devices that are capable of labeling the data, based on a semantic context corresponding to the data. Using semantic context when capturing the data provides for the ability to label and group the information for later use.

In some examples, a method for generating a semantic index is disclosed. The method includes receiving content data. The content data includes a plurality of subsets of content data. The method further includes labeling each of the plurality of subsets of content data, based on a semantic context corresponding to the content data, storing the plurality of subsets of content data and their corresponding labels, grouping the plurality of subsets of content data, based on their labels, thereby generating one or more groups of subsets of content data, and adapting a computing device to perform an action, based on the one or more groups of subsets of content data.

In some examples, the plurality of subsets of content data and their corresponding labels are stored in a database, and the action includes returning the database that includes the one or more groups of subsets of content data.

In some examples, the plurality of subsets of content data include a first type of content data and a second type of content data.

In some examples, the first type of content data and the second type of content data are different types of content data from the group of: audio content data, visual content data, gaze content data, weather content data, news content data, time content data, people content data, and location content data.

In some examples, the labeling of each of the plurality of subsets of content data includes: providing each of the plurality of subsets of content data and the semantic context to a machine-learning model. The machine learning model includes at least one of a natural language processor or a vision processor. The labeling further includes receiving, from the machine-learning model, a respective label corresponding to each of the plurality of subsets of content data.

Some examples further include generating a feature vector for each of the labels corresponding to a respective one of the plurality of subsets of content data. The grouping of the plurality of subsets of content data, based on their labels, includes determining a distance between each of the feature vectors, determining that one or more of the distances are less than a predetermined threshold, and grouping together the feature vectors with distances therebetween that are less than the predetermined threshold, thereby grouping together the respective subsets of the plurality of subsets of content data to which the feature vectors correspond.

In some examples, a timestamp is stored with each of the plurality of subsets of content data and their corresponding labels.

In some examples, the action includes annotating one or more elements on a display of a computing device.

In some examples, the action includes generating an email corresponding to the received content data.

In some examples, the action includes generating a calendar entry corresponding to the received content data.

In some examples, the action includes populating a clipboard with a document corresponding to the received content data.

In some examples, a method for retrieving a search result from a semantic index is disclosed. The method includes generating a user-interface, and receiving, via the user-interface, a query. The query includes information that corresponds to at least two different content types. The method further includes receiving, from a semantic index, a search result corresponding to the query. The semantic index is generated using content data that is stored and labelled, based on semantic context. The content data includes a plurality of subsets of content data that correspond to the at least two different content types.

Some examples further include, prior to receiving the search result, providing a suggested search query to reduce an expected number of search results for the query.

In some examples, the at least two different content types are from the group of: a person, a time, a location, audio content, visual content, weather, and a device.

In some examples, a system for generating a semantic index is disclosed. The system includes at least one processor and memory storing instructions that, when executed by the at least one processor, causes the system to perform a set of operations. The set of operations include: receiving content data. The content data includes a plurality of subsets of content data. The plurality of subsets of content data include a first subset of content data that corresponds to a virtual type of content and a second subset of content data that corresponds to a physical type of content. The set of operations further include labeling each of the plurality of subsets of content data, based on a semantic context that corresponds to the content data, grouping the plurality of subsets of content data, based on their labels, thereby generating one or more groups of subsets of content data, and performing an action, based on the one or more groups of subsets of content data.

Some examples further include one or more of a microphone, a camera, or a global positioning system (GPS), and the second subset of content data includes one or more from the group of: audio content data, visual content data, gaze content data, and location content data.

In some examples, the at least one processor includes a first processor of a first device and a second processor of a second device. The first subset of the plurality of subsets is received via the first device and the second subset of the plurality of subsets is received via the second device.

In some examples, the labeling of each of the plurality of subsets of content data includes: providing each of the plurality of subsets of content data and the semantic context to a machine-learning model. The machine-learning model includes at least one of a natural language processor or a vision processor. The labeling further includes receiving, from the machine-learning model, a respective label that corresponds to each of the plurality of subsets of content data.

In some examples, the set of operations further includes: generating a feature vector for each of the labels that corresponds to a respective one of the plurality of subsets of content data. The grouping of the plurality of subsets of content data, based on their labels, includes: determining a distance between each of the feature vectors, determining that one or more of the distances are less than a predetermined threshold, and grouping together the feature vectors with distances therebetween that are less than the predetermined threshold, thereby grouping together the respective subsets of the plurality of subsets of content data to which the feature vectors correspond.

In some examples, the set of operations further include: generating a user-interface, and receiving, via the user-interface, a query, the query comprising information that corresponds to two or more elements. The two or more elements are from at least two different content types. The set of operations further includes receiving, from a semantic index that includes the plurality of subsets of content data, a search result that corresponds to the query.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
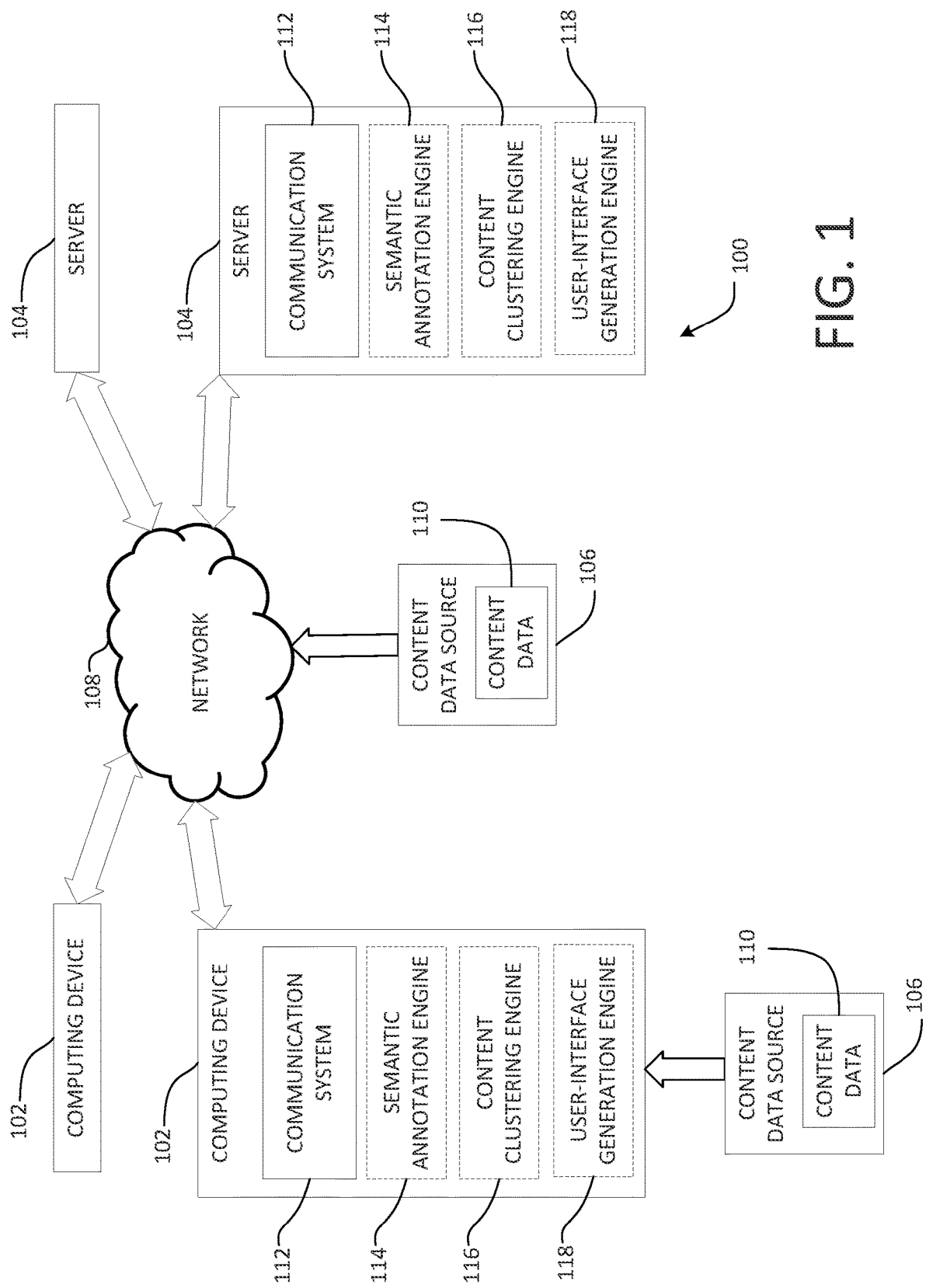
FIG. 1 illustrates an overview of an example system according to some aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents. Further, throughout the disclosure, the terms "about", "substantially", and "approximately" mean plus or minus 5% of the number or geometric constraint that each term precedes. For example, about 100 may mean 100+/−5.

As mentioned above, sometimes it is difficult for users to recall details, from various moments of time, in their everyday lives. Computing devices can receive a plurality of different types of contextual information related to user's everyday lives, such as audio data, video data, gaze data, weather data, location data, news data, or other types of ambient data which may be recognized by those of ordinary skill in the art. A user may associate some of these different types of contextual or ambient information with details in their everyday lives, such as documents that were presented in meetings, emails that were sent on given days, conversations regarding specific topics, etc.

As humans, often, we associate memories with contextual information related to the memory that we are trying to recall. For example, when looking for a document on a computer, a user may remember that a significant news story was published when they last had the document open, or that it was storming outside when they last had the document open, or that they last accessed the document, via their smartphone, while travelling to a specific park. Additionally, or alternatively, the user may remember that they were on a phone call or video call with a specific person, when they last had the document open. However, the user's process of tracing their own memory associations to determine where to locate the document on one or more of their computing devices can be time consuming, frustrating, and unnecessarily consume computational resources (e.g., of a processor, or of memory).

Further, in some examples, a user's computing device may record just a screen of the computing device, or just audio of the computing device, or just a location of the computing device, with the user's permission, such that the recording can be searched for associations that the user is trying to make, while trying to perform an action on their computing device (e.g., locate a document, open a document, send an email, schedule a calendar event, etc.). However, storing a recording (e.g., of video, audio, or a location) can occupy a relatively large amount of memory. Further, searching through the recording can be relatively time consuming and computationally expensive. Accordingly, there exists a need to improve user efficiency of performing actions on a computing device, based on contextual information.

Accordingly, some aspects of the present disclosure relate to methods, systems, and media for generating a semantic index. Generally, content data may be received that includes a plurality of subsets of content data. Each of the plurality of subsets of content data may be labelled, based on a semantic context corresponding to the content data. Each of the plurality of subsets of content data and their corresponding labels may be stored (e.g., in a database). The plurality of subsets of content data may be grouped, based on their labels, thereby generating one or more groups of subsets of content data. Further, a computing device may be adapted to perform an action, based on the one or more groups of subsets of content data.

Additionally, or alternatively, some aspects of the present disclosure relate to methods, system, and media for retrieving search results from a semantic index. Generally, a user-interface may be generated. A query may be received, via the user interface. The query may include information corresponding to two or more elements. The two or more elements may be from at least two different content types, as discussed further herein. A search result that corresponds to the query may be received from a semantic index.

Advantages of mechanisms disclosed herein may include an improved user efficiency for performing actions (e.g., locating a virtual document, generating a draft email, generating a draft calendar event, providing content information related to a virtual document, etc.) via a computing device, based on content that was summarized, using semantic context, and clustered, based on the summarizations (e.g., labels). Furthermore, mechanisms disclosed herein for generating a semantic index can improve computational efficiency by, for example, reducing an amount of memory that is needed to track content (e.g., via feature vectors or labels, as opposed to audio/video recording). Still further, mechanisms disclosed herein can improve computational efficiency for receiving content from a semantic index, such as by indexing feature vectors, as opposed to searching through relatively large recordings stored in memory.

FIG. 1 shows an example of a system 100, in accordance with some aspects of the disclosed subject matter. The system 100 may be a system for generating a semantic index. Additionally, or alternatively, the system 100 may be a system for using a semantic index, such as by receiving search results from the semantic index. The system 100 includes one or more computing devices 102, one or more servers 104, a content data source 106, and a communication network or network 108. The computing device 102 can receive content data 110 from the content data source 106, which may be, for example a microphone, a camera, a global positioning system (GPS), etc. that transmits content data, a computer-executed program that generates content data, and/or memory with data stored therein corresponding to content data. The content data 110 may include visual content data, audio content data (e.g., speech or ambient noise), devices content data, location content data, weather data, news data, time data, people data, document data (e.g., a virtual document), gaze content, and/or other types of virtual and/or real content data that may be recognized by those of ordinary skill in the art.

Additionally, or alternatively, the network 108 can receive content data 110 from the content data source 106, which may be, for example a microphone, a camera, a global positioning system (GPS), etc. that transmits content data, a computer-executed program that generates content data, and/or memory with data stored therein corresponding to content data. The content data 110 may include visual content data, audio content data (e.g., speech, or ambient noise), devices content data, location content data, weather data, news data, time data, people data, document data (e.g., a virtual document), gaze content, and/or other types of virtual and/or real content data that may be recognized by those of ordinary skill in the art.

Computing device 102 may include a communication system 112, a semantic annotation engine or component 114, a content clustering engine or component 116, and/or a user-interface generation engine or component 118. In some examples, computing device 102 can execute at least a portion of the semantic annotation component 114 to summarize or label one or more subsets of the received content data 106. For example, each of the subsets of the content data may be provided to a machine-learning model, such as a natural language processor and/or a visual processor, along with semantic context, to determine the summary or label corresponding to each of the respective subsets of content data.

Further, in some examples, computing device 102 can execute at least a portion of the content clustering component 116 to group subsets of content data, based on their summaries or labels (e.g., as determined by the semantic annotation component 114). For example, a feature vector may be generated for each of the labels that corresponds to a respective one of the subsets of content data. Each of the feature vectors may be mapped in a vector space, and a distance between each of the feature vectors may be determined. The feature vectors may be grouped together, based on the determined distances, thereby grouping together the respective subsets of the subsets of content data to which the feature vectors correspond.

Further, in some examples, the computing device 102 can execute at least a portion of the user-interface component 118 to generate a user-interface for interacting with a semantic index, such as a semantic index that includes the content data 110 that is labelled by the semantic annotation component 114 and/or grouped by the content clustering component 116. For example, a user-interface may be generated that receives a query, from a user, that includes information corresponding to at least two different content types.

Server 104 may include a communication system 112, a semantic annotation engine or component 114, a content clustering engine or component 116, and/or a user-interface generation engine or component 118. In some examples, server 104 can execute at least a portion of the semantic annotation component 114 to summarize or label one or more subsets of the received content data 106. For example, each of the subsets of the content data may be provided to a machine-learning model, such as a natural language processor and/or a visual processor, along with semantic context, to determine the summary or label corresponding to each of the respective subsets of content data.

Further, in some examples, server 104 can execute at least a portion of the content clustering component 116 to group subsets of content data, based on their summaries or labels (e.g., as determined by the semantic annotation component 114). For example, a feature vector may be generated for each of the labels that corresponds to a respective one of the subsets of content data. Each of the feature vectors may be mapped in a vector space, and a distance between each of the feature vectors may be determined. The feature vectors may be grouped together, based on the determined distances, thereby grouping together the respective subsets of the subsets of content data to which the feature vectors correspond.

Further, in some examples, the server 104 can execute at least a portion of the user-interface component 118 to generate a user-interface for interacting with a semantic index, such as a semantic index that includes the content data 110 that is labelled by the semantic annotation component 114 and/or grouped by the content clustering component 116. For example, a user-interface may be generated that receives a query, from a user, that includes information corresponding to at least two different content types.

Additionally, or alternatively, in some examples, computing device 102 can communicate data received from content data source 106 to the server 104 over a communication network 108, which can execute at least a portion of the semantic annotation component 114, the content clustering component 116, and/or the user-interface generation component 118. In some examples, the semantic annotation component 114 may execute one or more portions of methods/processes 500 and/or 700 described below in connection with FIGS. 5 and 7, respectively. Further in some examples, the content clustering component 116 may execute one or more portions of methods/processes 500 and/or 700 described below in connection with FIGS. 5 and 7, respectively. Further, in some examples, the user-interface generation engine 118 may execute one or more portions of methods/processes 500 and/or 700 described below in connection with FIGS. 5 and 7, respectively.

In some examples, computing device 102 and/or server 104 can be any suitable computing device or combination of devices, such as a desktop computer, a vehicle computer, a mobile computing device (e.g., a laptop computer, a smartphone, a tablet computer, a wearable computer, etc.), a server computer, a virtual machine being executed by a physical computing device, a web server, etc. Further, in some examples, there may be a plurality of computing device 102 and/or a plurality of servers 104. It should be recognized by those of ordinary skill in the art that content data 110 may be received at one or more of the plurality of computing devices 102 and/or one or more of the plurality of servers 104, such that mechanisms described herein can generate semantic indexes and/or use the semantic indexes, based on an aggregation of content data 110 that is received across the computing devices 102 and/or the servers 104.

In some examples, content data source 106 can be any suitable source of content data (e.g., a microphone, a camera, a GPS, a sensor, etc.). In a more particular example, content data source 106 can include memory storing content data (e.g., local memory of computing device 102, local memory of server 104, cloud storage, portable memory connected to computing device 102, portable memory connected to server 104, etc.).

In another more particular example, content data source 106 can include an application configured to generate content data. In some examples, content data source 106 can be local to computing device 102. Additionally, or alternatively, content data source 106 can be remote from computing device 102 and can communicate content data 110 to computing device 102 (and/or server 104) via a communication network (e.g., communication network 108).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2:
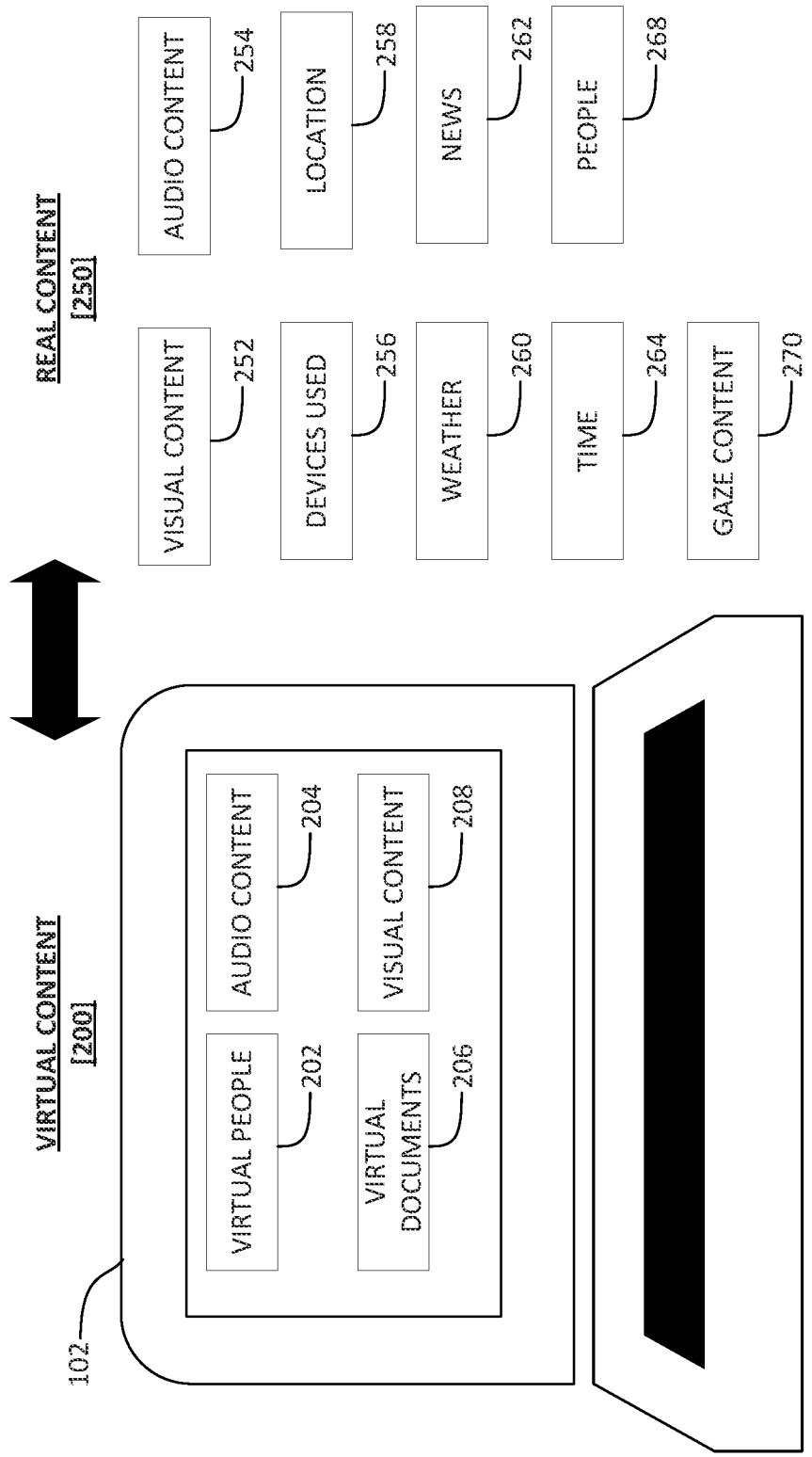
FIG. 2 illustrates examples of virtual content and real content, according to some aspects described herein.

FIG. 2 illustrates examples of virtual content 200 and real content 250, according to some aspects described herein. As discussed with respect to system 100, mechanisms described herein may include receiving content data (e.g., content data 110) from a content data source. The content data may be virtual content 200 and/or real content 250.

Generally, when a user is interacting with a computing device (e.g., computing device 102), they are interacting with a virtual environment, while physically in a real (e.g., physical environment). Therefore, contextual information that a user may recall when interacting with computing device may be virtual content (e.g., virtual content 200) and/or real content (e.g., real content 250).

The virtual content 200 includes virtual people 202, audio content 204, virtual document 206, and/or visual content 208. The virtual people 202 may include data corresponding to virtual images that are generated of individuals, such as via a video stream, still images, virtual avatars corresponding to people, etc. Additionally, or alternatively, the virtual people 202 may include data corresponding to people, such as icons corresponding to people, or other indicators corresponding to specific people that may be recognized by those of ordinary skill in the art.

The audio content 204 may include data corresponding to speech data that is generated in a virtual environment. For example, the audio content 204, in a virtual environment, may be generated by the computing device 102 to correspond to audio that is received from a user (e.g., where the user is speaking into a microphone a computing device that may be separate from the computing device 102). Additionally, or alternatively, the audio content 204 may correspond to other types of audio data that may be generated in a virtual environment, such as animal sounds, beeps, buzzes, or another type of audio indicator.

The virtual documents 206 may include a type of document that is found in a virtual environment. For example, the virtual document 206 may be a text-editing document, a presentation, an image, a spreadsheet, an animated series of images, a calendar invite, an email, a notification, or any other type of virtual document that may be recognized by those of ordinary skill in the art.

The visual content 208 may include data corresponding to graphical content that may be displayed or generated by a computing device. For example, the visual content 208 may be content that is generated via an application being run on the computing device 102 (e.g., a web-browser, a presentation application, a teleconferencing application, a business management application, etc.). The visual content 208 may include data that is scraped from a screen display of the computing device 102. For example, any visual indication that is displayed on the computing device 102 may be included in the visual content 208.

Each of the plurality of types of virtual content 200 may be subsets of the virtual content 200 that may be received by mechanisms described herein, as a subset of the content data 110. Further, while specific examples of types of virtual content have been discussed above, additional and/or alternative types of virtual content may be recognized by those of ordinary skill in the art as they relate to virtual environments and/or a virtual component of augmented reality environment.

The real content 250 includes visual content 252, audio content 254, devices used 256, location 258, weather 260, news 262, time 264, people 268, and/or gaze content 270. The visual content 252 may include data that is received from a camera or optical sensor. For example, the visual content 252 may include information regarding a user's biometric data, that is collected with a user's permission, or information regarding a user's physical environment, or information regarding clothing that a user is wearing, etc. Additional examples of visual content 252 may be recognized by those of ordinary skill in the art.

The audio content 254 includes audio data that originates from a real or physical environment. For example the audio content 254 may include data corresponding to speech data (e.g., audio that is spoken by a user or audio that can otherwise be converted into text associated with speech). Additionally, or alternatively, the audio content 204 may include data corresponding to ambient noise data. For example, the audio content 204 may include animal sounds (e.g., a dog barking, a cat meowing, etc.), traffic sounds (e.g., airplanes, cars, sirens, etc.), nature sounds (e.g., waves, wind, etc.). Additional examples of audio content 254 may be recognized by those of ordinary skill in the art.

The devices used 256 may include information regarding which device a user is using. For example, when a user is trying to locate a virtual document (e.g., virtual document 206), they may remember last accessing the virtual document on a first computing device (e.g., a mobile phone), as compared to a second computing device (e.g., a laptop). Therefore, based on a user's memory that associates a specific device, with an element (e.g., virtual document or computer application) that is trying to be accessed or discovered, mechanisms disclosed herein can locate or open the desired element that is trying to be accessed or discovered.

The location 258 may include information regarding a location at which a user is located. For example, location data may be received from a global positioning system (GPS), satellite positing system, cellular positioning system, or other type of location determining system. A user may associate a location in which they were physically located with actions that were performed on a computing device. Therefore, for example, using mechanisms disclosed herein, a user may provide a query such as "what document was I working on, while I as at the beach, and videoconferencing my boss?", and mechanisms disclosed herein may determine one or more documents to which the user may be referring, based on information that is stored regarding which document they were working on, when they were at the beach, as well as when they were videoconferencing with their boss.

The weather 260 may include information regarding weather that is around a user. For example, for a given time, as determined by the time content 264, weather information (e.g., precipitation, temperature, humidity, etc.) may be received or otherwise obtained for where a user is located (e.g., based on the location content 258). Therefore, for example, using mechanisms disclosed herein, a user may provide a query such as "who was I on a video call with, on my cell phone, when it was freezing and snowing outside?" Mechanisms disclosed herein may determine what virtual person (e.g., from the virtual people content 202) the user is trying to recall, based on when the user's cell phone (e.g., from the devices used content 256) was used, and on when it was freezing and snowing outside (e.g., from the weather content 260).

The news 262 may include information regarding recent news stories of which a user may be aware. For example, for a given time, as determined by the time content 264, a relatively recent news story covering a significant event may have been released. Therefore, for example, using mechanisms disclosed herein, a user may provide a query such as "who was I on a video call with, on my laptop, on the day when Chicago's basketball team won the national championships?" Mechanisms disclosed herein may determine what virtual person (e.g., from the virtual people content 202) the user is trying to recall, based on when the user's laptop (e.g., from the devices used content 256) was used, and on when Chicago's basketball team won the national championships (e.g., from the news content 262). Additional or alternative types of news stories may include holidays, birthdays, local events, national events, natural disasters, celebrity updates, scientific discoveries, sports updates, or any other type of news that may be recognized by those of ordinary skill in the art.

The time 264 may include one or more timestamps at which various content types are received. For example, each content types (e.g., virtual content 200 and/or real content 250, or specific content types therewithin) may be timestamped, when they are obtained or received. Generally, mechanisms described herein may be temporal, in that actions that are performed by computing devices, based on a plurality of stored content types, may rely on timestamps assigned to each of the content types.

The people 268 may include information regarding people in a physical environment surrounding one or more computing devices (e.g., computing device 102). The people may be identified using biometric recognition (e.g., facial recognition, voice recognition, fingerprint recognition, etc.), after receiving and storing any related biometric data, with a user's permission. Additionally, or alternatively, the people may be identified by engaging performing a specific action on the computing device (e.g., engaging with a specific software). Further, some people may be identified by logging into one or more computing devices. For example, a person may be the owner of the computing device, and the computing device may be linked to the person (e.g., via a passcode, biometric entry, etc.). Therefore, when the computing device is logged into, the person is thereby identified. Similarly, a person may be identified by logging into a specific application (e.g., via a passcode, biometric entry, etc.). Therefore, when the specific application is logged into, the person is thereby identified. Additionally, or alternatively, the one or more people may be identified using a radio frequency identification tag (RFID), an ID badge, a bar code, a QR code, or some other means of identification that is capable of identifying a person via some technological interface. Additionally, or alternatively, a proximity of certain people with respect to one another may be identified based on two or more people being identified using mechanisms described herein.

The gaze content 270 may include information corresponding to where a user is looking on one or more computing devices. Accordingly, if a first user is on a videoconference call and tells a second user that they will send the second user a document that they discussed, while looking at the document on their computing device, then mechanisms described herein may generate a draft email to send the draft document, from the first user, to the second user, based on the audio content received from the videoconference call, the gaze content received, and recognition of who the second user is, such that the email is drafted to be sent to the current person. Similarly, the draft document may be saved to a user's clipboard, such that the draft document can be pasted into an email, message, or other form of virtual communication.

Additional types of virtual content 200 and/or real content 250 may be recognized by those of ordinary skill in the art. Further, while certain content types have been shown and described to be types of virtual content 200 (e.g., virtual people 202, audio content 204, virtual documents 206, and visual content 208), while other content types have been shown and described to be real content (e.g., visual content 252, audio content 254, devices used 256, location 258, weather 260, news 262, time 264, people 268, and gaze content 270) it should be recognized that in some examples, such categorizations of virtual content 200 and real content 250 can be interchanged for content types disclosed herein (e.g., when a location may refer to a virtual location, such as a virtual meeting space, as well as a physical location at which a device that is being used, to access the virtual meeting space, is located), whereas in other instances, such categorization of virtual content 200 and real content 250 are fixed (e.g., in example where a location refers solely to a physical location, such as a geographic coordinate location in the physical world).

Generally, the different content types discussed with respect to FIG. 2 provide various contexts with which a user associates information that they are trying to recall and/or use to perform an action, via computing device. In some examples, a user may provide real content (e.g., real content 250) information to receive information from a computing device, or perform an action on a computing device, related to virtual content (e.g., virtual content 200). Additionally, or alternatively, a user may provide virtual content (e.g., virtual content 200) information to receive information from a computing device related to real or physical content (e.g., real content 250). Additionally, or alternatively, a user may provide a combination of virtual and real content to receive information corresponding to related real content, receive information corresponding to virtual content, and/or to perform an action, via a computing device, related to the virtual content.

In some examples, the computing device 102 may be a tablet computing device that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 3:
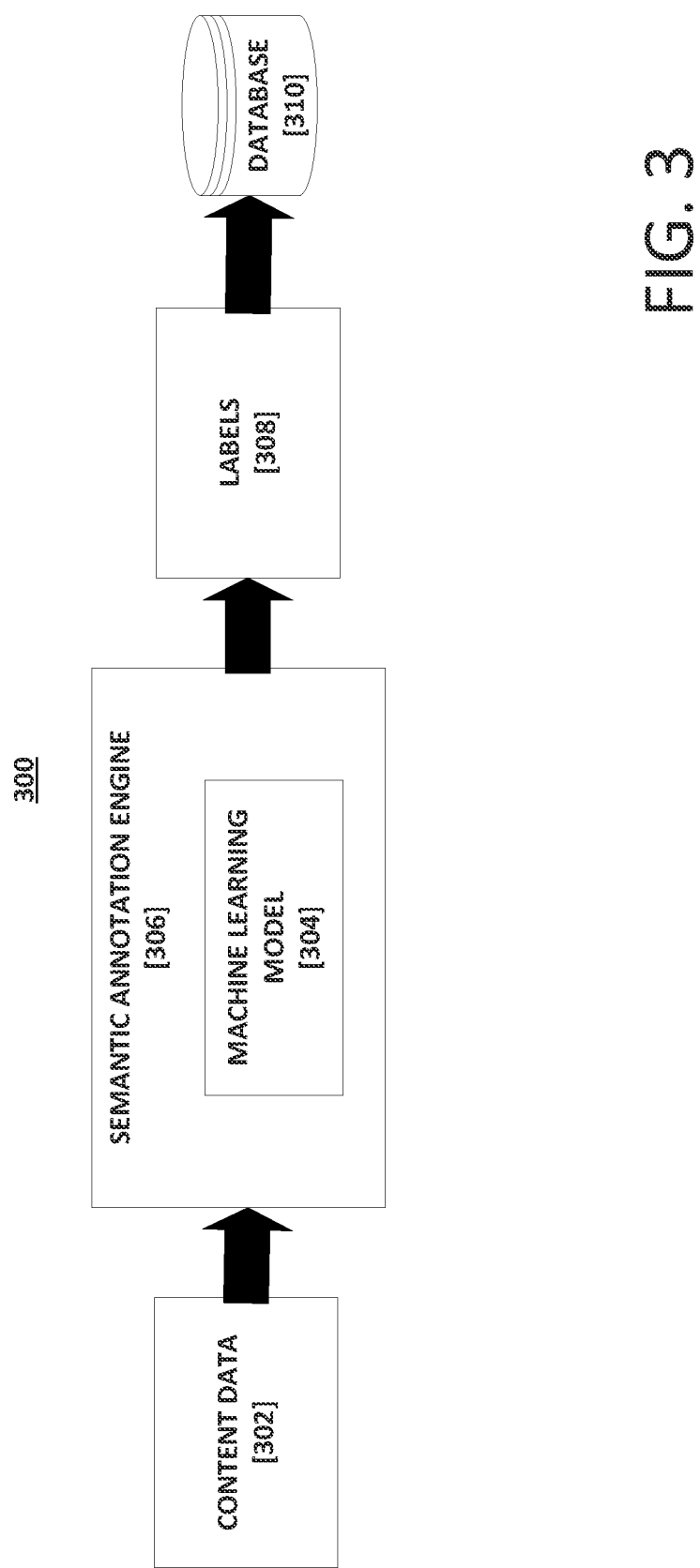
FIG. 3 illustrates an example flow of storing labelled content data, according to some aspects described herein.

FIG. 3 illustrates an example flow 300 of storing labelled content data. Content data 302 may be input into a semantic annotation engine or component 304. The content data 302 may be similar to the content data 110 discussed earlier herein with respect to system 100. For example, the content data may include subsets of data that correspond to virtual content 200 and/or real content 250 (see FIG. 2). Further, the semantic annotation component 304 may be similar to the semantic annotation component 114 of the example system 100 (see FIG. 1).

The semantic annotation engine 304 may include a machine-learning model 306. The machine-learning model 306 may be trained to determine, based on content data and semantic context, related to the content data, summaries or labels 308 corresponding to the content data. For example, the machine-learning model 306 may be trained to classify content data into pre-determined classifications, such as people, times, devices, weather, clothing, documents (e.g., photos, text-editor documents, presentation document), sounds, etc. Additionally, or alternatively, the machine-learning model 306 may include at least one of a natural language processor or a visual processor (e.g., a natural language processor, a visual processor, or both of a natural language processor and a visual processor) that is trained, based on a data set that may be as large as the Internet, to determine a label corresponding to a respective subset of data from the content data 302.

The labels corresponding to the subsets of data, from the content data 302, are stored in a database 310. Additionally, in some examples, the subsets of data may be stored in the database 310, with their corresponding labels 308. The database 310 may be located in memory of a computing device, such as computing device 102. Additionally, or alternatively, the database 310 may be located in memory of a server, such as server 104. In some examples, the database 310 may be accessible (e.g., for read and/or write operations) via a plurality of devices (e.g., computing devices 102 and/or server 104). Alternatively, in some examples, the database 310 may only be accessible via a single device (e.g., a single computing device 102 or a single server 104).

Figure 4:
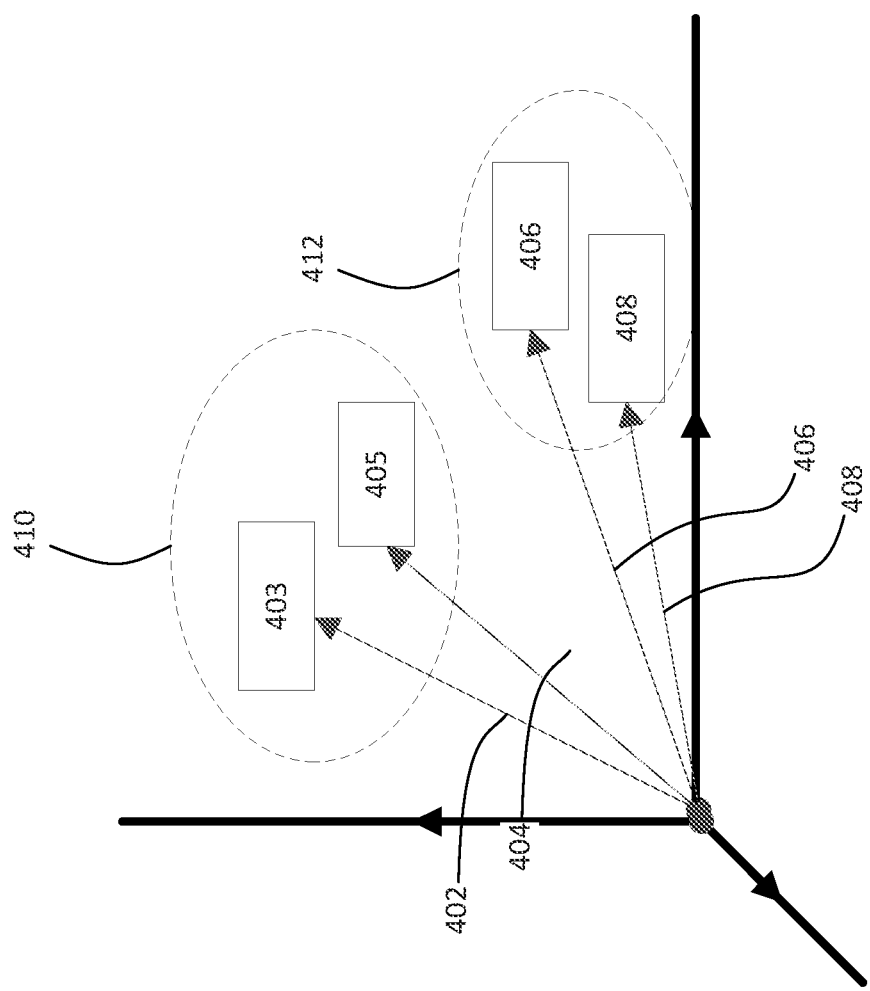
FIG. 4 illustrates an example vector space, according to some aspects described herein.

FIG. 4 illustrates an example vector space 400 according to some aspects described herein. The vector space 400 includes a plurality of feature vectors, such as a first feature vector 402, a second feature vector 404, a third feature vector 406, and a fourth feature vector 408. Each of the plurality of feature vectors 402, 404, 406, and 408 are generated to correspond to a respective label 403, 405, 407, 409 of each of a plurality of subsets of content data (e.g., subsets of content data 110 and/or content data 302). The labels 403, 405, 407, 409 may be similar to the labels 308, discussed with respect to FIG. 3. The labels 403, 405, 407, 409 may be string values or embeddings.

The feature vectors 402, 404, 406, and 408 each have distances that are measurable between each other. For example, a distance between two of the feature vectors 402, 404, 406, and 408 may be measured using cosine similarity. Alternatively, a distance between two of the feature vectors 402, 404, 406, and 408 may be measured using another distance measuring technique that may be recognized by those of ordinary skill in the art.

A similarity of each of the feature vectors 402, 404, 406, and 408 may be determined, based on the measured distances between the feature vectors 402, 404, 406, and 408. The similarity between the feature vectors 402, 404, 406, and 408 may be used to group or cluster the feature vector 402, 404, 406, and 408 in one or more groups of feature vectors, such as a first group 410, and a second group 412.

In some examples, each of the groups of feature vectors 410, 412 may include a predetermined number of feature vectors, such that groups of feature vectors are given a predetermined size. Additionally, or alternatively, in some examples, The distances between each of the feature vectors 402, 404, 406, and 408 may be compared to a predetermined threshold.

The labels 403 and 405 that correspond to feature vectors 402 and 404, respectively, may fall within the same content group. For example, the label 403 may be a sound of an animal, and the label 405 may be a sound of a person. Therefore, the first group 410, which includes the vectors 402 and 404, which correspond to labels 403 and 405, may be assigned a label that encompasses the label 403 and the label 405, such as a label corresponding to audio sounds.

As another example, if the first label 403 corresponds to a virtual person, and the second label 405 corresponds to an article of clothing being worn by the virtual person, then the labels 403 and 405 may be grouped together, and the group may be assigned a label corresponding to virtual content. Additional, and/or alternative examples of assigning labels to a group of vectors that are descriptively inclusive of each of the labels corresponding to feature vectors included within the group of vectors, may be recognized by those of ordinary skill in the art. The descriptively inclusive vectors assigned to the groups of vectors may be generated by a machine-learning model, such as a machine-learning model similar to machine-learning model 306 (see FIG. 3).

The first group of vectors 410 and the second group of vectors 412 may be stored in a database, such as the database 310, discussed with respect to FIG. 3. Namely, memory corresponding to the database may be arranged or stored data in a manner that groups the first group of vectors 410 together, and the second group of vector 412 together, within the database. Further, each of the feature vectors 402, 404, 406, 408 may be stored with corresponding timestamps. The timestamps may be times at which the content to which the feature vectors 402, 404, 406, 408 each respectively correspond were generated and/or received (e.g., by the computing device 102).

In some examples, feature vectors and their corresponding labels generated in accordance with mechanisms described herein (e.g., feature vectors 402, 404, 406, 408) may be stored for an indefinite period of time. Additionally, or alternatively, in some examples, as new feature vectors and/or labels are generated and stored, the new feature vectors and/or labels may overwrite older feature vectors and/or labels that are stored in memory (e.g., based on timestamps that corresponding to the stored feature vectors), such as to improve memory capacity. Additionally, or alternatively, in some examples, feature vectors and/or labels may be deleted from memory at specified intervals of time, and/or based on an amount of memory that is available (e.g., in the database 310), to improve memory capacity. Additionally, or alternatively, in some examples, feature vectors and/or labels may be deleted based on whether new feature vector and/or labels are determined to be similar to the old feature vectors and/or labels, to improve memory capacity. For example, if a user is regularly in videocalls with the same person, then feature vectors corresponding to the videocalls with that person may be deemed to be of higher importance than other feature vectors (e.g., such as how memories are reinforced when interacting regularly with the same people).

Generally, the ability to store feature vectors corresponding to received content data allows a user to associate and locate data in a novel manner that has the benefit of being computationally efficient. For example, instead of storing a video recording of a screen of a computing device, or environment around a computing device, a user may instead store, using mechanisms described herein, summarizations or labels of content items, in the form of feature vectors. The summarization or labels may be 64-bit words, as opposed to video recordings that may be a few hundred of thousands of pixels, per frame. Therefore, the mechanisms described herein are efficiency for reducing memory usage, as well as for reducing usage of processing resources to search through stored content. Additional and/or alternative advantages may be recognized by those of ordinary skill in the art.

Figure 5:
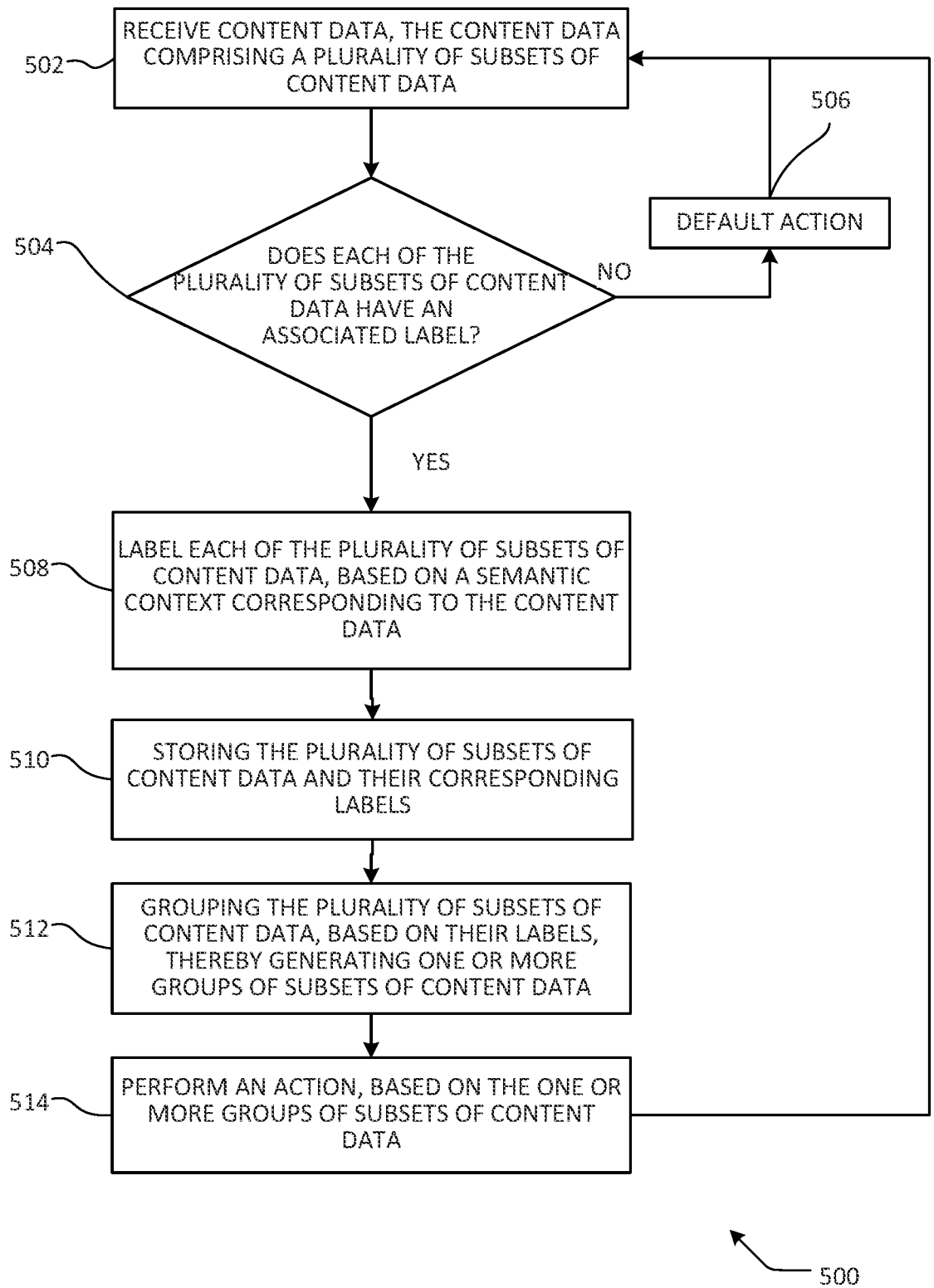
FIG. 5 illustrates an example method for generating a semantic index, according to some aspects described herein.

FIG. 5 illustrates an example method 500 for generating a semantic index, according to some aspects described herein. In examples, aspects of method 500 are performed by a device, such as computing device 102 and/or server 104, discussed above with respect to FIG. 1.

Method 500 begins at operation 502 wherein content data is received. The content data includes a plurality of subsets of content data. The plurality of subsets of content data may include two or more from the group of: audio content data, visual content data, gaze content data, weather content data, and location content data. Additionally, or alternatively, the plurality of subsets of content data may include two or more of any of the content data types disclosed earlier herein (e.g., with respect to FIG. 2 and the corresponding description thereof, herein).

At operation 504, it is determined if each of the plurality of subsets of content data have an associated label. In some examples, each of the plurality of subsets may be classified into predetermined labels, based on a degree of confidence. If the degree of confidence for a subset of content data is below a predetermined threshold, then in such instances, the subset of content data may not have any associated label. Alternatively, each of the plurality of subsets may be provided to a machine-learning model that includes at least one of a natural language processor or a visual processor, such that each of the plurality of subsets of content data will have an associate label. Alternatively, in some examples, it may be assumed by mechanisms described herein that each of the plurality of subsets of content data have an associated label.

If it is determined that each of the plurality of subsets of content data do not have an associated label, flow branches "NO" to operation 506, where a default action is performed. For example, the content data, or a subset thereof, may have an associated pre-configured action. In other examples, method 500 may comprise determining whether the content data, or a subset thereof, has an associated default action, such that, in some instances, no action may be performed as a result of the received content data. Method 500 may terminate at operation 506. Alternatively, method 500 may return to operation 502 to provide an iterative loop of receiving content data that includes a plurality of subsets of content data, and determining if each of the plurality of subsets of content data have an associated label.

If however, it is determined that each of the plurality of subsets of content data have an associate label, flow instead branches "YES" to operation 508, where, based on a semantic context corresponding to the content data, each of the plurality of subsets of content data are labelled. In some examples, each of the plurality of subsets of content data and the semantic context may be provided to a machine-learning model (e.g., machine-learning model 306 of FIG. 3). The machine-learning model may be or include at least one of a natural language processor or a visual processor. A respective label that corresponds to each of the plurality of subsets of content data may be received from the machine-learning model.

In some examples, each of the labels may be displayed on a graphical user-interface of a computing device, at a location on the graphical-user interface that corresponds to the associated content data of the respective labels. For example, if the content data is virtual content data, such as visual content data, then the labels correspond to the content data may be a location on a display screen at which the visual content data is displayed by a user. In this respect, content may be annotated on a user's screen, based on the labelling of each of the plurality of subsets of content data.

Flow advances to operation 510 wherein the plurality of subsets of content data and their corresponding labels are stored. Additionally, in some examples, the subsets of data may be stored in a database (e.g., database 310), with their corresponding labels. The database may be located in memory of a computing device, such as computing device 102. Additionally, or alternatively, the database may be located in memory of a server, such as server 104. In some examples, the database may be accessible (e.g., for read and/or write operations) via a plurality of devices (e.g., computing devices 102 and/or server 104). Alternatively, in some examples, the database may only be accessible via a single device (e.g., a single computing device 102 or a single server 104).

At operation 512, the plurality of subsets of content data are grouped, based on their labels, thereby generating one or more groups of subsets of content data. A feature vector may be generated for each of the labels corresponding to a respective one of the plurality of subsets of content data. The grouping of the plurality of subsets of content data, based on their labels, may include determining a distance between each of the feature vectors (e.g., as discussed with respect to FIG. 4). Further, it may be determined if the distances are less than a predetermined threshold. The feature vectors with distances therebetween that are less than the predetermined threshold may be grouped together. By such grouping, responsively, and/or similarly, the respective subsets of the plurality of subsets of content data to which the feature vectors correspond may also be grouped together.

At operation 514, an action is performed, based on the one or more groups of subsets of content data. In some examples, the action includes annotating one or more elements on a display screen of a computing device. For example, visual indications may be generated on the display screen of the computing device, based on the grouped plurality of subsets of content data. If one or elements on a display screen are determined to be a person, then a visual indication may be generated that is associated with a people content type. Alternatively, if one or more elements are determined to be a time, then a visual indication may be generated that is associated with a time content type. Alternatively, if one or more elements are determined to be a command or task (e.g., as may be read from an email, message, etc.), then a visual indication may be generated that is associated with a command or task content type. The visual indications may be text labels, shapes surrounding the one or more elements, highlighted colors overlaying the one or more elements, arrows adjacent to the one or more elements, etc.

In some examples, the action includes generating an email corresponding to the received content data and/or populating a clipboard with a document corresponding to the received content data. For example, if a first person is on a video call with a second person, and the first person indicates that they will email something to the second person, then a computing device of the first user may be adapted to generate a draft email to the second person, that includes whatever document the first person indicated that they intended to send. Additionally, or alternatively, the computing device of the first user may be adapted to populate a clipboard, of the first person, such that the document (or another content type) may be pasted, for example, in an email, a message, a webpage, a text-editor, or some other application that may receive pasted data.

In some examples, the action includes returning the database comprising the one or more groups of subsets of content data. The database may be a semantic index which may be used in accordance with some examples disclosed herein, as well as for other examples that may be recognized by those of ordinary skill in the art.

In some examples, the action includes generating a calendar entry that corresponds to the received content data. For example, if a first person is on a video call with a second person, and the first person indicates that they will schedule a time to discuss something, with the second person, then a computing device of the first user may be adapted to generate a calendar entry to the second person, that includes information corresponding to whatever was indicated will be discussed.

Generally, mechanisms disclosed herein allow for a semantic index or database to be created based on a plurality of different types of content data that may be received at a plurality of different times. Advantages of mechanisms disclosed herein may include improved user efficiency for performing actions (e.g., locating a virtual document, generating a draft email, generating a draft calendar event, providing content information related to a virtual document, etc.) via a computing device, based on content that was summarized, using semantic context, and clustered or grouped, based on the summarizations (e.g., labels). Furthermore, mechanisms disclosed herein for generating a semantic index can improve computational efficiency by, for example, reducing an amount of memory that is needed to track content (e.g., via feature vectors or labels, as opposed to audio/video recordings). Still further, mechanisms disclosed herein can improve computational efficiency for receiving content from a semantic index due to an efficient arrangement of stored data, in the form of feature vectors.

Method 500 may terminate at operation 514. Alternatively, method 500 may return to operation 502 (or any other operation from method 500) to provide an iterative loop, such as of receiving content data, labeling subsets of the content data, storing the subsets of content data with their corresponding labels, grouping the subsets of content data, based on their labels, and performing an action, based on the grouped subsets of content data.

Figure 6:
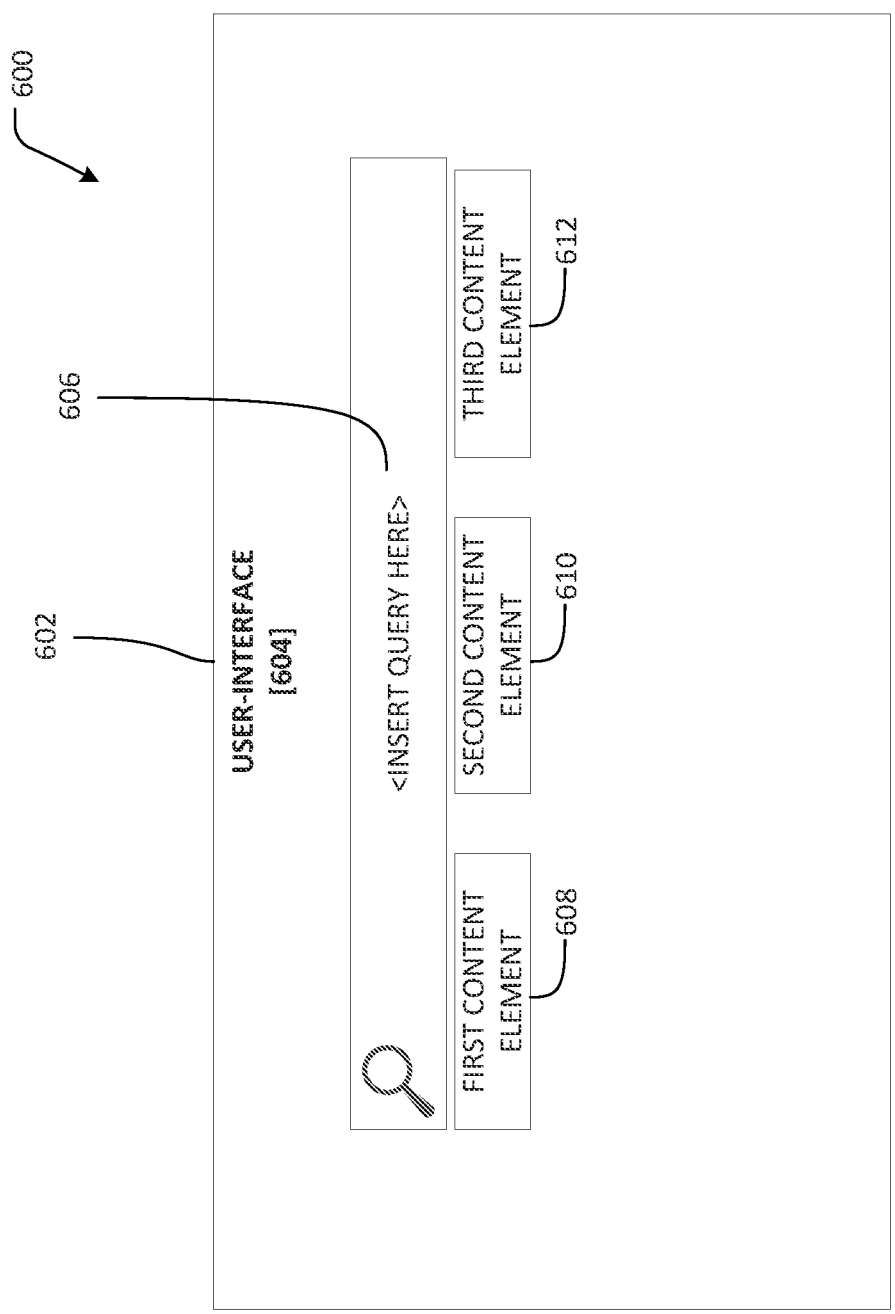
FIG. 6 illustrates an example system for retrieving a search result from a semantic index, according to some aspects described herein.

FIG. 6 illustrates an example system 600 for retrieving a search result from a semantic index. The example system 600 incudes computing device 602. The computing device 602 may be similar to the computing device 102 described earlier herein with respect to FIG. 1. The system 600 further includes a user-interface 604. The user-interface 604 may be a graphical user-interface (GUI) that is displayed on a screen of the computing device 602. The user-interface 604 may be configured to receive a query 606 from a user.

In some examples, the user-interface 604 may receive the query 606 from the user via text, or ink, or an uploaded image, or an uploaded document, or speech, or a gesture, or another type of user-input. Further, the user-interface includes a plurality of content filters, such as a first filter for a first content element 608, a second filter for a second content element 610, and a third filter for a third content element 612. The first content element 608, second content element 610, and third content element 612 may each be a different one of the plurality of content types discussed earlier herein, such as with respect to the content data 110 of FIG. 1, the virtual content 200 of FIG. 2, and/or the real content 250 of FIG. 2.

The first filter for the first content element 608, the second filter for the second content element 610, and the third filter for the third content element 612 may each be selected or updated by a user, based on a speech command, a text command, a drop-down menu generate via a GUI, a mechanical button of or associated with the computing device 602, a dial of or associated with the computing device 602, a touchscreen of or associated with the computing device 602, or any other type of user input that may be used to select a content type for each of the discussed filters 608, 610, 612.

In some examples, the query 606 may be a suggested query based on user-input provided by a user. For example, if a user is looking for a document, then the user may be prompted to provide information regarding from which of a plurality devices the user last accessed the document, or what the weather was when the user last accessed the document, or what time it was (e.g., day, month, season, time of day, etc.) when the user last accessed the document. Additional and/or alternative suggestions may be recognized by those of ordinary skill in the art, in light of, at least, the content types provided herein.

The suggested queries 606 generated in accordance with mechanisms disclosed herein may reduce an expected number of search results associated with the query. For example, if a first user is looking for a document that was sent to them by a second user during a video call, and the first user is on a relatively large number of video calls, then a query of "what document was I sent on a video call last month?" may return a relatively large number of results. However, mechanisms disclosed herein may provide options to modify the first user's query such that it is specified what color shirt the second user was wearing, or what background noises were on the video call with the second user, or other content types, that the first user may recall, and that would reduce the expected number of search results for the query.

Figure 7:
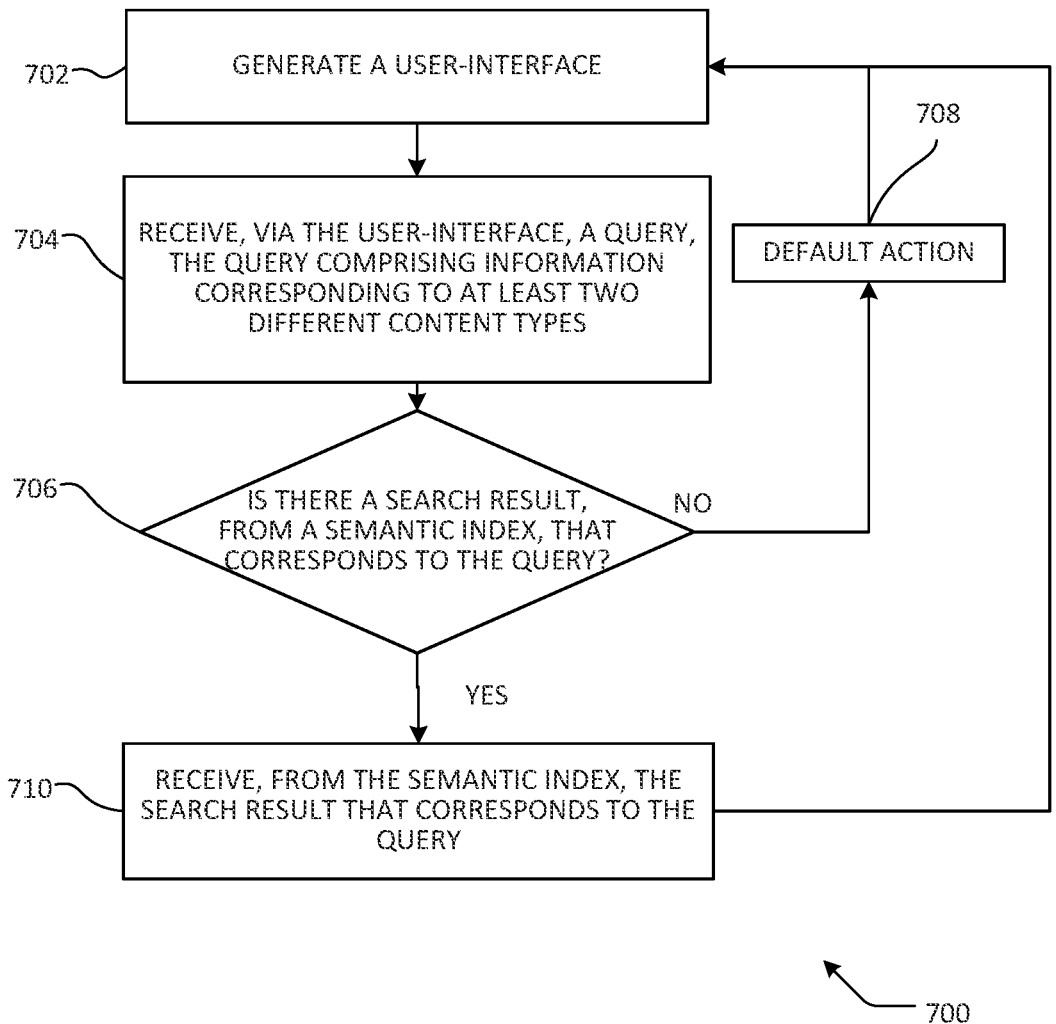
FIG. 7 illustrates an example method for retrieving a search result from a semantic index, according to some aspects described herein.

FIG. 7 illustrates an example method for retrieving a search result from a semantic index, according to some aspects described herein. In examples, aspects of method 700 are performed by a device, such as a computing device 102 and/or server 104, discussed above with respect to FIG. 1.

Method 700 begins at operation 702, wherein a user-interface (such as user-interface 602) is generated. The user-interface may be a graphical user-interface (GUI) that is displayed on a screen of a computing device (e.g., the computing device) 602. Alternatively, the user-interface may be a touchpad, mechanical buttons, a camera, a microphone, or any other interface that is configured to receive user input.

At operation 704, a query is received, via the user-interface. The query includes information that corresponds to at least two different content types. In some examples, the user-interface may receive the query from the user via text, or ink, or an uploaded image, or an uploaded document, or speech, or a gesture, or another type of user-input. Further, two different content types may each be a different one of the plurality of content types discussed earlier herein, such as with respect to the content data 110 of FIG. 1, the virtual content 200 of FIG. 2, and/or the real content 250 of FIG. 2. For example, the two different content types may be from the group of: a person, a time, a location, audio content, visual content, weather, and a device.

At operation 706, it is determined if there is a search results, from a semantic index, that corresponds to the query. If it is determined that there is not a search results, from the semantic index, that corresponds to the query, flow branches "NO" to operation 708, where a default action is performed. For example, the query and/or semantic index, may have an associated pre-configured action. In other examples, method 700 may comprise determining whether the query and/or semantic index have an associated default action, such that, in some instances, no action may be performed as a result of the received query. Method 700 may terminate at operation 708. Alternatively, method 700 may return to operation 702 or 704 to provide an iterative loop.

If however, it is determined that there are search results from the semantic index that correspond to the query, flow instead branches "YES" to operation 710, where, search results are received, from the semantic index, that correspond to the query. The search results may be ranked. For example, a vector may be generated that corresponds to the query, and a distance between the query and one or more feature vectors (e.g., feature vectors 402, 404, 406, 408) of the semantic index may be determined, such that feature vectors, or groups of feature vectors with smallest distance the query, are ranked the highest, or vice-versa.

Method 700 may terminate at operation 710. Alternatively, method 700 may return to operation 702 (or any other operation from method 700) to provide an iterative loop, such as of generating a user-interface, receiving a query with information that corresponds to at least two different content types, and receiving search results, from a semantic index, that correspond to the query.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
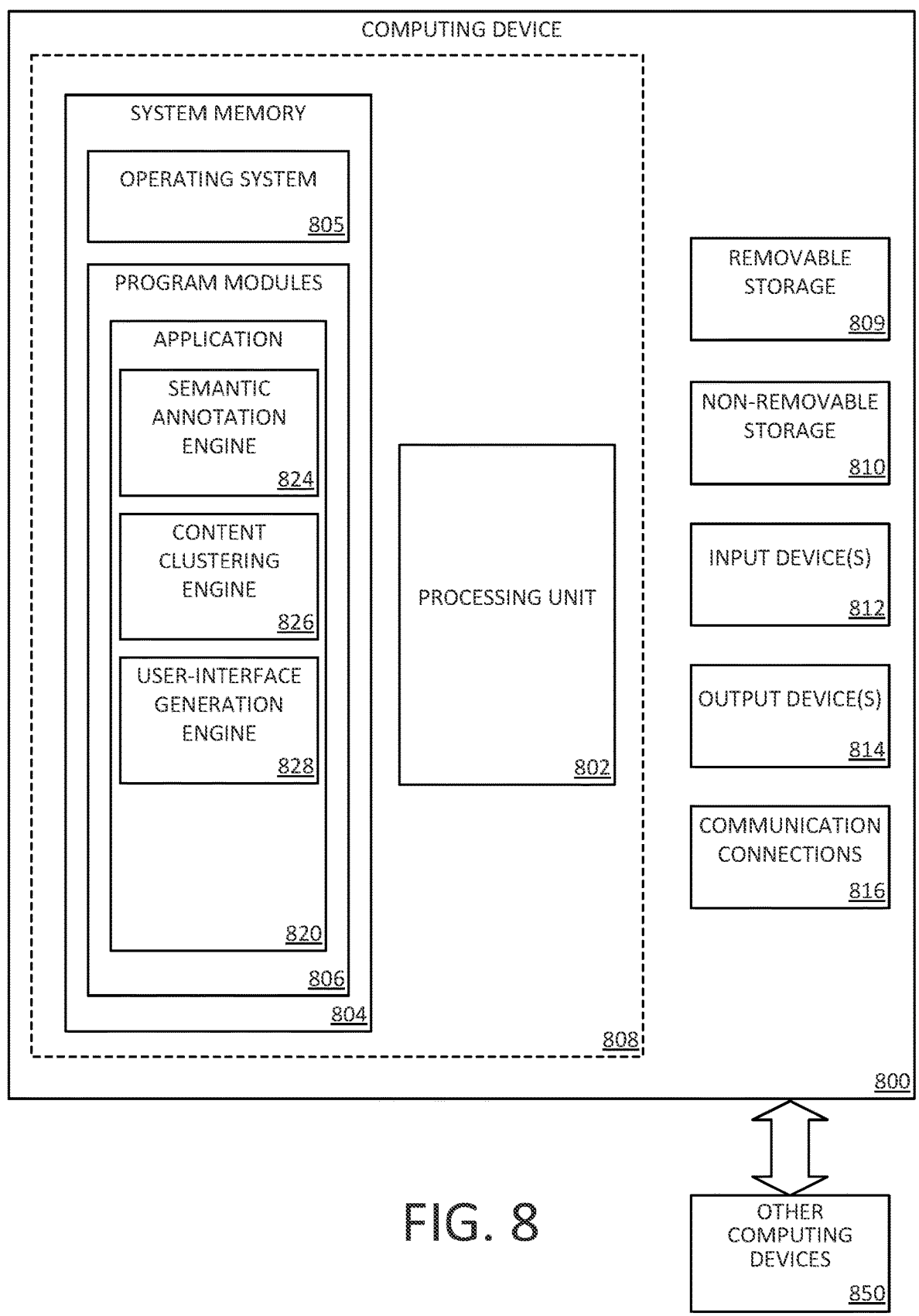
FIG. 8 illustrates a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above, including computing device 82 in FIG. 1. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories.

The system memory 804 may include an operating system 805 and one or more program modules 806 suitable for running software application 820, such as one or more components supported by the systems described herein. As examples, system memory 804 may store semantic annotation engine or component 824, content clustering engine or component 826, and/or user-interface generation engine or component 828. The operating system 805, for example, may be suitable for controlling the operation of the computing device 800.

Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
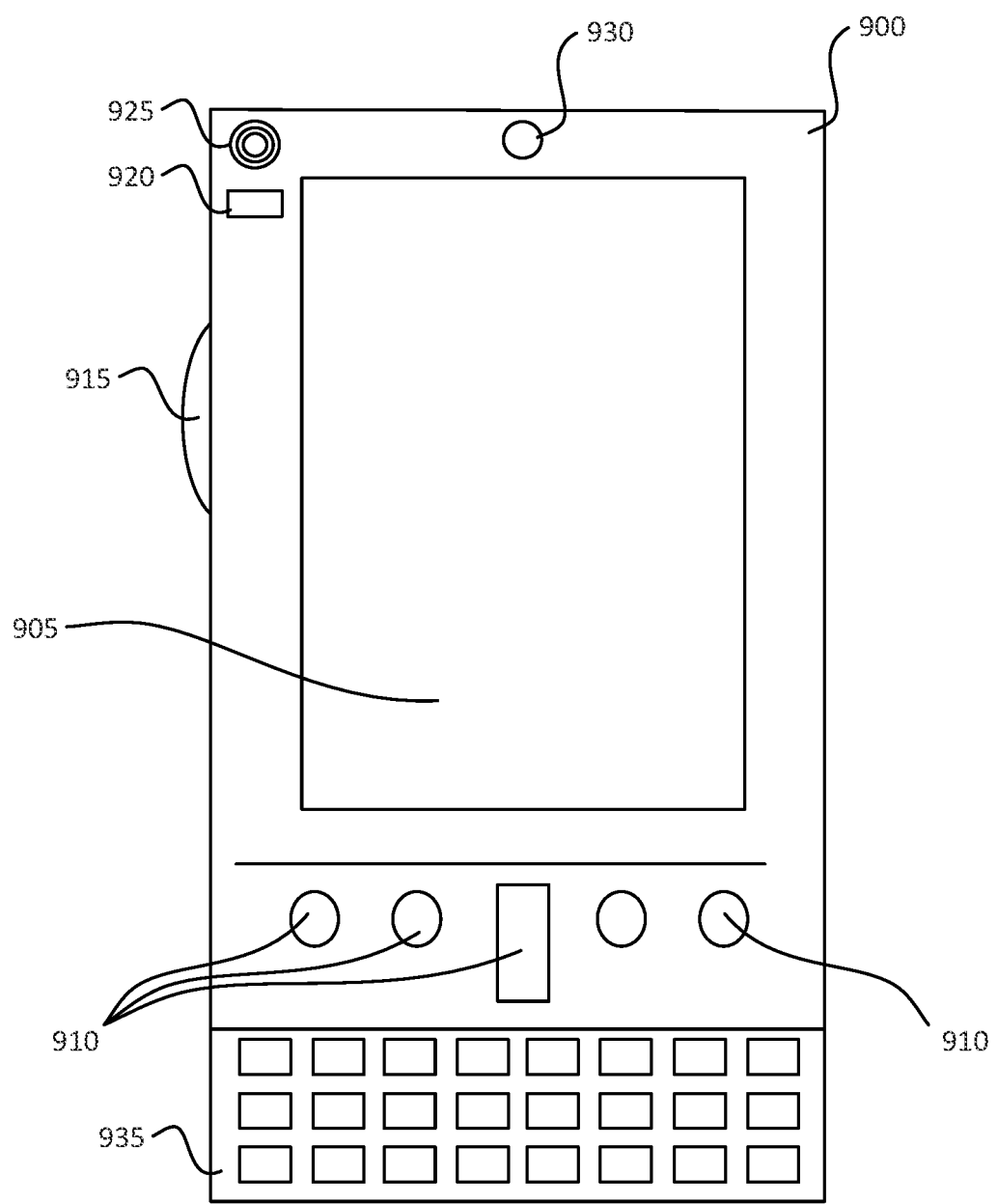
FIGS. 9A and 9B are simplified block diagrams of a mobile computing device with which aspects of the present disclosure may be practiced.
Figure 9B:
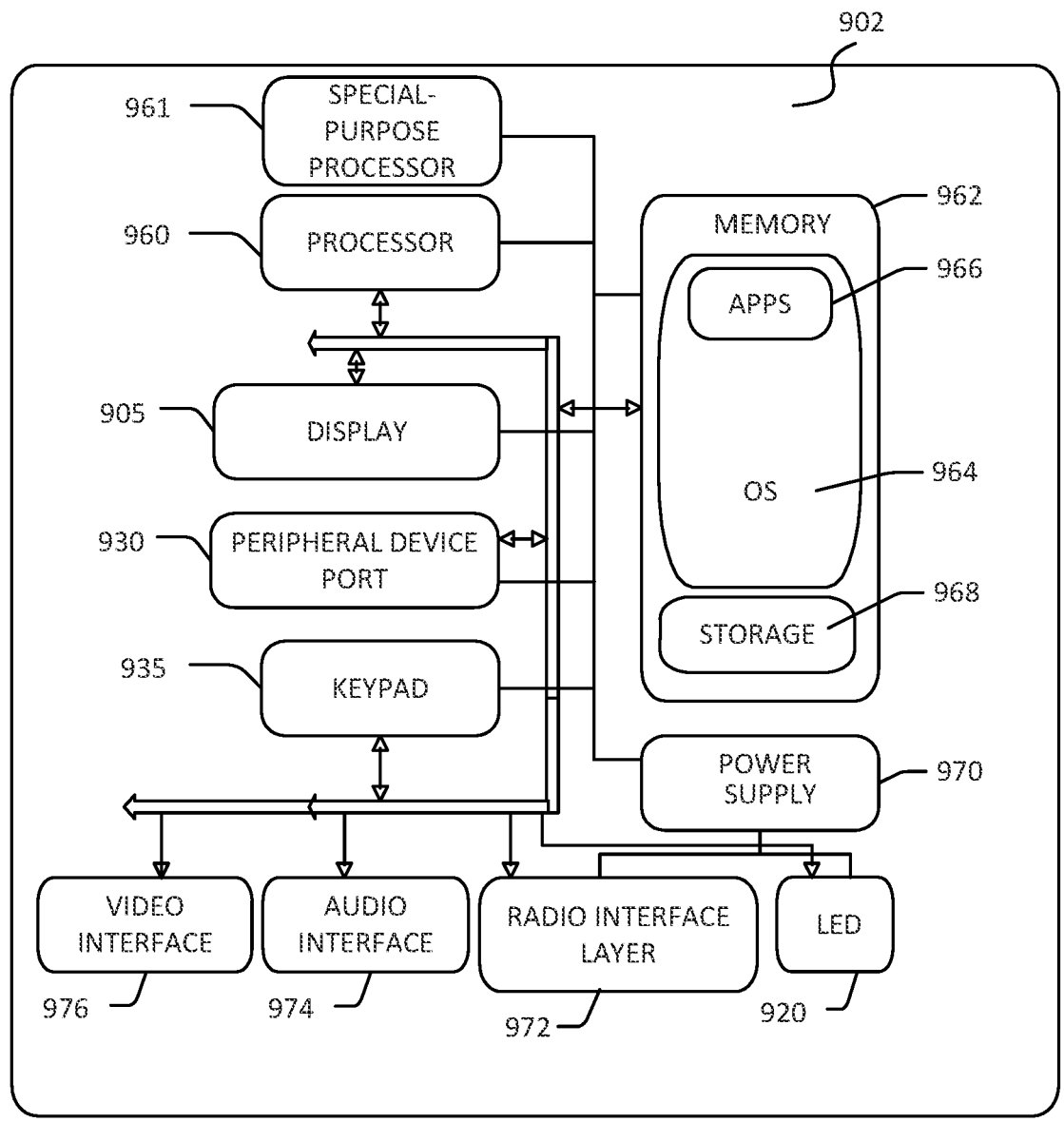

FIGS. 9A and 9B illustrate a mobile computing device 900, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The one or more input buttons 910 may be "soft" buttons that are generated on the touch screen display. The display 905 of the mobile computing device 900 may also function as an input device (e.g., a touch screen display).

If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some examples.

In yet another alternative example, the mobile computing device 900 is a portable phone system, such as a cellular phone. The mobile computing device 900 may also include an optional keypad 935. Optional keypad 935 may be a physical keypad or a "soft" keypad generated on the touch screen display.

In various examples, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In some examples, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., a semantic annotation engine, a content clustering engine, a user-interface generation engine, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and/or special-purpose processor 961 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
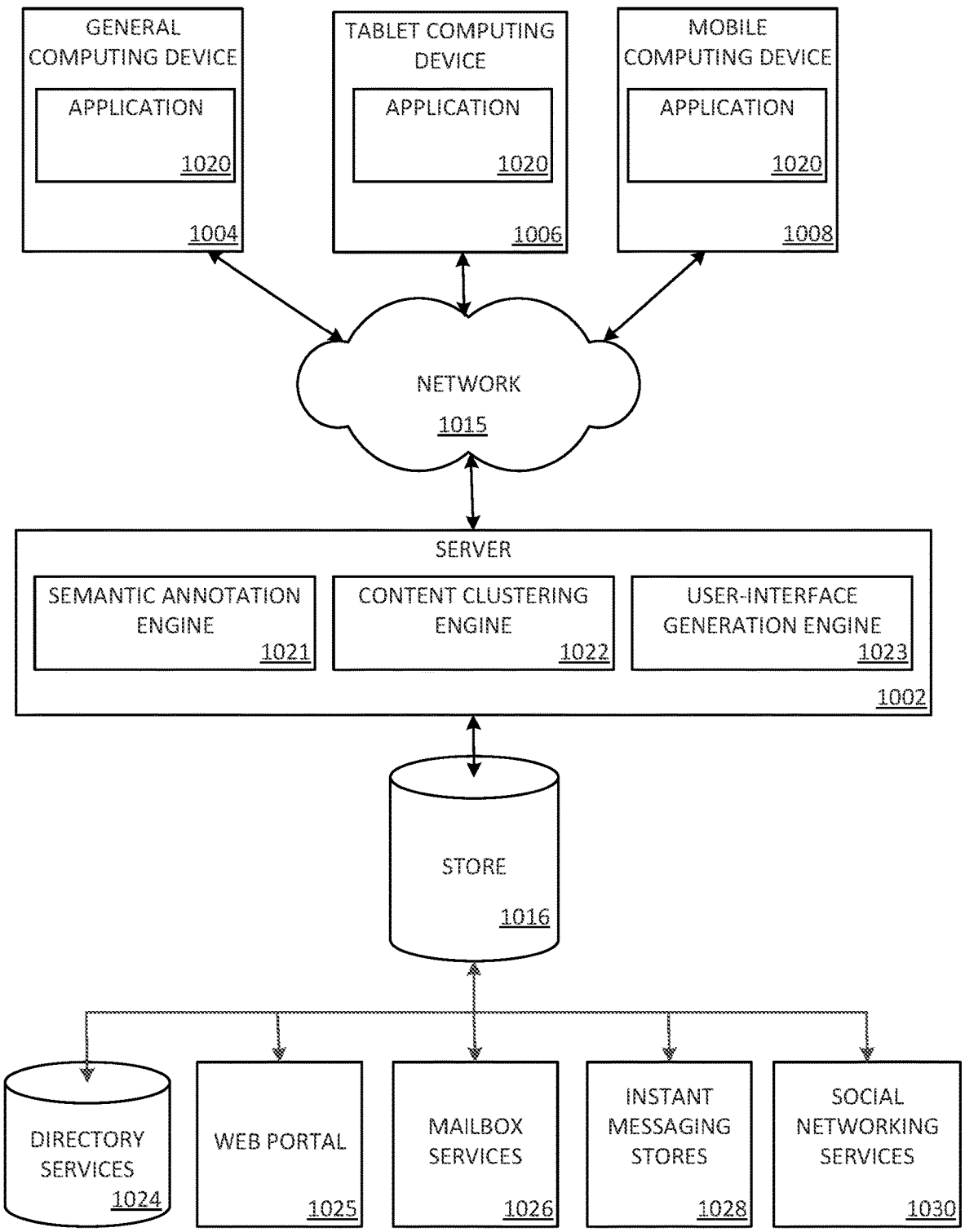
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1024, a web portal 1025, a mailbox service 1026, an instant messaging store 1028, or a social networking site 1030.

An application 1020 (e.g., similar to the application 820) may be employed by a client that communicates with server device 1002. Additionally, or alternatively, semantic annotation engine 1021, content clustering engine 1022, and/or user-interface generation engine 1023 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these examples of the computing devices may obtain content from the store 1016, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating a semantic index, the method comprising:
   receiving content data, the content data comprising a plurality of subsets of content data;
   labeling each of the plurality of subsets of content data, based on a semantic context corresponding to the content data;
   generating a feature vector for each of the labels corresponding to a respective one of the plurality of subsets of content data;
   storing the plurality of subsets of content data and their corresponding labels;
   grouping the plurality of subsets of content data, based on their labels, thereby generating one or more groups of subsets of content data, wherein the grouping of the plurality of subsets of content data, based on their labels, comprises:
      determining a distance between each of the feature vectors;
      determining that one or more of the distances are less than a predetermined threshold; and
      grouping together the feature vectors with distances therebetween that are less than the predetermined threshold, thereby grouping together the respective subsets of the plurality of subsets of content data to which the feature vectors correspond; and
   adapting a computing device to perform an action, based on the one or more groups of subsets of content data.

2. The method of claim 1, wherein the plurality of subsets of content data and their corresponding labels are stored in a database, and wherein the action comprises returning the database comprising the one or more groups of subsets of content data.

3. The method of claim 1, wherein the plurality of subsets of content data comprise a first type of content data and a second type of content data.

4. The method of claim 3, wherein the first type of content data and the second type of content data are different types of content data from the group of: audio content data, visual content data, gaze content data, weather content data, news content data, time content data, people content data, and location content data.

5. The method of claim 1, wherein the labeling of each of the plurality of subsets of content data comprises:
   providing each of the plurality of subsets of content data and the semantic context to a machine-learning model, the machine-learning model comprising at least one of a natural language processor or a vision processor; and
   receiving, from the machine-learning model, a respective label corresponding to each of the plurality of subsets of content data.

6. The method of claim 1, wherein a timestamp is stored with each of the plurality of subsets of content data and their corresponding labels.

7. The method of claim 1, wherein the action comprises annotating one or more elements on a display of a computing device.

8. The method of claim 1, wherein the action comprises generating an email corresponding to the received content data.

9. The method of claim 1, wherein the action comprises generating a calendar entry corresponding to the received content data.

10. The method of claim 1, wherein the action comprises populating a clipboard with a document corresponding to the received content data.

11. A method for retrieving a search result from a semantic index, the method comprising:
    generating a user-interface;
    receiving, via the user-interface, a query, the query comprising information corresponding to at least two different content types; and
    receiving, from a semantic index, a search result corresponding to the query,
    wherein the semantic index is generated using content data that is stored and labelled, based on semantic context, the content data comprising a plurality of subsets of content data corresponding to the at least two different content types, and the storing and labelling comprising grouping the plurality of subsets of content data by:
       determining a distance between feature vectors generated for labels corresponding to the plurality of subsets of content data;
       determining that one or more of the distances are less than a predetermined threshold; and
       grouping together the feature vectors with distances therebetween that are less than the predetermined threshold, thereby grouping together the respective subsets of the plurality of subsets of content data to which the feature vectors correspond.

12. The method of claim 11, further comprising:
    prior to receiving the search result, providing a suggested query to reduce an expected number of search results for the query.

13. The method of claim 11, wherein the at least two different content types are from the group of: a person, a time, a location, audio content, visual content, weather, and a device.

14. A system for generating a semantic index, the system comprising:
    at least one processor;
    memory storing instructions that, when executed by the at least one processor, causes the system to perform a set of operations, the set of operations comprising:
       receiving content data, the content data comprising a plurality of subsets of content data, the plurality of subsets of content data comprising a first subset of content data corresponding to a virtual type of content and a second subset of content data corresponding to a physical type of content;
       labeling each of the plurality of subsets of content data, based on a semantic context corresponding to the content data;
       generating a feature vector for each of the labels corresponding to a respective one of the plurality of subsets of content data;

grouping the plurality of subsets of content data, based on their labels, thereby generating one or more groups of subsets of content data, wherein the grouping of the plurality of subsets of content data, based on their labels, comprises:
  determining a distance between each of the feature vectors;
  determining that one or more of the distances are less than a predetermined threshold; and
  grouping together the feature vectors with distances therebetween that are less than the predetermined threshold, thereby grouping together the respective subsets of the plurality of subsets of content data to which the feature vectors correspond; and
performing an action, based on the one or more groups of subsets of content data.

15. The system of claim 14, further comprising one or more of a microphone, a camera, or a global positioning system (GPS), and wherein the second subset of content data comprise one or more from the group of: audio content data, visual content data, gaze content data, and location content data.

16. The system of claim 14, wherein the at least one processor comprises a first processor of a first device and a second processor of a second device, wherein the first subset of the plurality of subsets is received via the first device, and wherein the second subset of the plurality of subsets is received via the second device.

17. The system of claim 14, wherein the labeling of each of the plurality of subsets of content data comprises:
  providing each of the plurality of subsets of content data and the semantic context to a machine-learning model, the machine-learning model comprising at least one of a natural language processor or a vision processor; and
  receiving, from the machine-learning model, a respective label corresponding to each of the plurality of subsets of content data.

18. The system of claim 14, wherein the set of operations further comprises:
  generating a user-interface;
  receiving, via the user-interface, a query, the query comprising information corresponding to two or more elements, the two or more elements being from at least two different content types; and
  receiving, from a semantic index comprising the plurality of subsets of content data, a search result corresponding to the query.

* * * * *